Patented Apr. 22, 1941

2,239,250

UNITED STATES PATENT OFFICE 2,239,250

MANUFACTURE OF CYCLIC KETONES

Robert Robinson, Oxford, England

No Drawing. Application April 26, 1939, Serial
No. 270,230. In Great Britain May 5, 1938

16 Claims. (Cl. 260—586)

This invention relates to the production of cyclic ketones useful, for instance, as intermediates in chemical synthesis, notably in the synthesis of medicinal substances.

On condensing ketones of the general formula R.CO.CH$_3$, where R is an aromatic group, for instance a phenyl, naphthyl, or suitably substituted phenyl or naphthyl group, with furfuraldehyde, compounds of the general formula

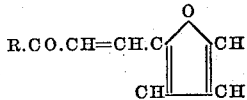

are produced. Thus if the compound R.CO.CH$_3$ is acetophenone the product is furfurylidene-acetophenone,

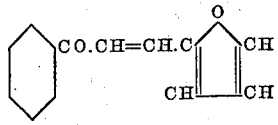

while if R is a β-naphthyl group the product is

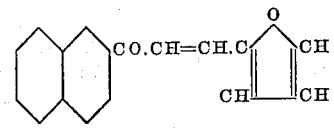

These furfurylidene derivatives on treatment with aqueous alcoholic hydrochloric acid are converted into diketonic acids of the general formula R.CO.CH$_2$.CH$_2$.CO.CH$_2$.CH$_2$.COOH.

Acids of this general formula can be converted by means of such reagents as dilute aqueous solutions of caustic potash or soda into substituted cyclopentenone acetic acids of the type

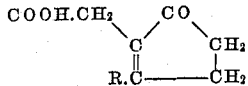

Thus where R is a β-naphthyl group the product is 3 - β-naphthyl-Δ$^2$-cyclopenten-1-one-2-acetic acid of the formula

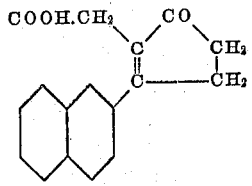

The cyclopentenone acetic acids can be reduced (for instance by hydrogenation in methyl alcohol solution in the presence of palladised strontium carbonate) to compounds in which the five carbon atom ring is saturated, having the formula

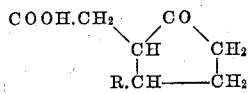

It has now been found that it is possible to condense the carboxyl group of compounds of the types

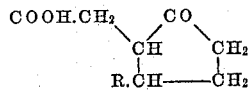

and

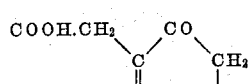

(where R is a substituted or unsubstituted phenyl or β-polynuclear-aromatic group, for instance β-naphthyl group) with the group R and form compounds in which the five carbon atom ring is fused to the group R by an intervening six carbon atom ring, by eliminating water between the carboxyl group and the ortho- or α-position of the group R by means of a condensing agent. Thus if the group R is a phenyl group the ring formation will take place at the ortho position to give a compound of skeleton structure

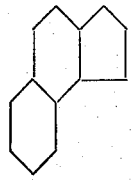

while if the group R is a β-naphthyl group, the ring formation will take place at the α-position as in the skeleton ring system

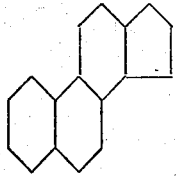

Where the five carbon atom ring of the initial ketone is saturated, the condensation may be effectively carried out with the aid of phosphoric anhydride in benzene solution or, preferably, phosphoric anhydride in syrupy phosphoric acid solution, and the product is in general one with a skeleton structure of the type

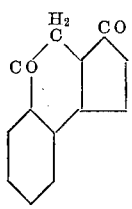

in which the newly formed ring is ketonic in structure. The condensation can also be effected, although with an unsatisfactory yield, using 80% sulphuric acid at 98° C. Thus 3,β-naphthyl-cyclopentan-1-one-2-acetic acid can be converted to 3',4-diketo-1,2,3,4-tetrahydro-1,2-cyclopentenophenanthrene

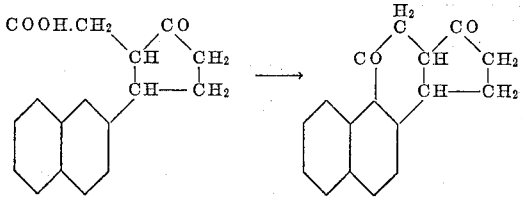

Where, however, the five carbon ring is unsaturated, the newly formed ring invariably appears in the enolic form and a product having a skeleton structure of the type

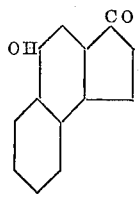

is obtained. For instance, 3,β-naphthyl-Δ²-cyclopenten-1-one-2-acetic acid is converted to the compound 4-hydroxy-3'-keto-1,2-cyclopentenophenanthrene

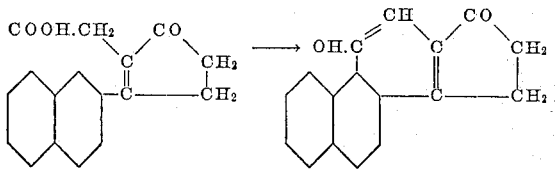

Similarly, 3-phenyl-Δ²-cyclopenten-1-one-2-acetic acid can be converted to 4-hydroxy-3'-keto-1,2-cyclopentenonaphthalene.

The condensation in the case of the compounds having an unsaturated five carbon atom ring can be effected by means of such condensing agents as sulphuric acid or an aliphatic anhydride, e. g. acetic anhydride or propionic anhydride. Acetic anhydride (with boiling) is preferably employed, and in this case the product appears as the acetyl derivative, the hydroxy group being esterified. This acetyl derivative can readily be hydrolysed to the hydroxy compound itself, for instance by treating it with aqueous alcoholic caustic soda and then acidifying.

The group R may as indicated above be suitably substituted, for instance by one or more hydroxy groups, one or more alkoxy groups such as the methoxy group, or one or more halogen atoms such as chlorine, or by combinations of such substituents. Thus R may be 6-methoxy-β-naphthyl or 5-chloro-6-methoxy-β-naphthyl, in which case the products obtained by means of the invention where the five carbon atom ring referred to is unsaturated will be

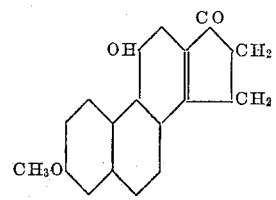

and

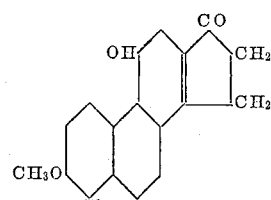

respectively, namely (7-methoxy)- and (8-chloro-7-methoxy)-4-hydroxy-3'-keto-1,2-cyclopentenophenanthrenes. The corresponding compounds where the five carbon atom ring is saturated are

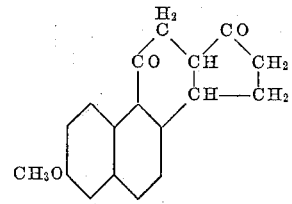

and

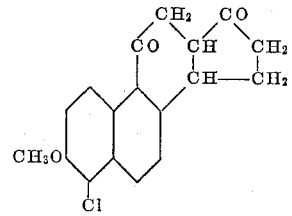

respectively, namely (3',4-diketo-7-methoxy)- and (3',4-diketo-8-chloro-7-methoxy)-1,2,3,4 tetrahydro-1,2-cyclopentenophenanthrenes. If the group R is 6-hydroxy-β-naphthyl, the corresponding hydroxy compounds are of course obtained.

The invention is illustrated by the following examples (in which the parts are by weight):

*Example 1*

The compound 4-hydroxy-3'-keto-1,2-cyclopentenonaphthalene is prepared as follows:

An intimate mixture of one part of 3-phenyl-Δ²-cyclopenten-1-one-2-acetic acid and 20 parts of concentrated sulphuric acid is heated for 10 minutes at a temperature of 95° C.; 5 parts of water are then added and heating at the above temperature is continued for 3 minutes longer. Water is then added slowly so as to keep the mixture hot for one or two minutes more. As the dilution with water proceeds the required product separates; it is collected and washed with aqueous sodium carbonate solution and then with water. It crystallises from alcohol in pale yellow needles which melt after slight decomposition above 250° C. at 290-295° C. with decomposition, and which are soluble in aqueous caustic alkali solutions to give solutions with a deep yellow colour.

The acid employed as a starting material in this example may be prepared as follows:

1 part of ζ-phenyl-γζ-diketoheptoic acid (prepared as described by Kehrer and Igler, Ber. (1899), 32, 1178 and (1901), 34, 1263) is dissolved in 100 parts of a 2% aqueous solution of potassium hydroxide and the liquid is either boiled for 45 minutes, heated at 95° C. during 1¼ hours or kept for 3 days at the room temperature. The solution is then strongly acidified with hydrochloric acid, and 3-phenyl-Δ²-cyclopenten-1-one-2-acetic acid is precipitated in good yield. The acid may be recrystallised from a convenient solvent, such as benzene, and is obtained as very pale yellow needles which melt at 141° C.

Example 2

The compound 4-hydroxy-3'-keto-1,2-cyclopentenophenanthrene is prepared as follows:

10 parts of the acid 3-β-naphthyl-Δ²-cyclopenten-1-one-2-acetic acid (which may be obtained by treating 1 part of ζ-β-naphthyl-γζ-diketoheptoic acid with 100 parts of a 2% aqueous solution of potassium hydroxide in a similar way to that described at the end of Example 1) are boiled with 75 parts of acetic anhydride under a reflux condenser during 30 minutes and the excess acetic anhydride is then removed by distillation. A suitable quantity of methyl alcohol (about 40 parts) is added to the residue, and the mixture is boiled with trituration of the lumps of solid material. After cooling the mixture the crystalline material is filtered off and dried. It consists of the acetyl derivative of the required product and may be crystallised from acetic acid, from which it separates in colourless needles which melt at 207° C. By hydrolysis of this substance by means of a hot aqueous alcoholic solution of sodium hydroxide and acidification of the product the required phenanthrene derivative is precipitated. This may be recrystallised from iso-amyl alcohol, from which solvent the product crystallises in pale yellow needles which soften at 300° C. and melt at 310–315° C. to a brown tar.

Example 3

The compound 7-methoxy-4-hydroxy-3'-keto-1,2-cyclopentenophenanthrene is prepared as follows:

The acid 3-(6-methoxy-β-naphthyl)-Δ²-cyclopenten-1-one-2-acetic acid is converted into the acetyl derivative of the required product by following the procedure described in Example 2, and this acetyl compound melts at 243° C. It may be hydrolysed by boiling with aqueous methyl alcoholic potassium hydroxide, when it quickly dissolves, and on acidification of the solution with acetic acid, the required product is precipitated. It may be recrystallised if desired, by solution in pyridine and by the addition of acetic acid. On heating, the substance darkens at 268° C., softens at 285° C. and melts to a brown oil at 293–299° C.

The acid used as starting material in the example may be prepared as follows:

A 1% solution of ζ-(6-methoxy-β-naphthyl)-γζ-diketoheptoic acid in 2% aqueous potassium hydroxide is heated at 95° C. during 1 hour. On acidifying the solution with hydrochloric acid the cyclopentenone acid is precipitated and it is then collected and washed with water. It may be recrystallized from ethyl acetate or aqueous acetic acid and it forms straw coloured needles which melt at 204–205° C.

Example 4

8-Chloro-7-methoxy-4-hydroxy-3'-keto-1,2-cyclopenteno-phenanthrene is prepared in a similar manner to that described in Examples 2 and 3 from 3-(5-chloro-6-methoxy-β-naphthyl)-Δ²-cyclopenten-1-one-2-acetic acid, which may itself be obtained from ζ-(5-chloro-6-methoxy-β-naphthyl)-γζ-diketoheptoic acid.

The cyclopentenophenanthrene finally obtained melts at 335° C. with decomposition, and its acetyl derivative forms grey leaflets of melting point 254–5° C. with decomposition.

Example 5

3-β-Naphthylcyclopentan-1-one-2-acetic acid can be obtained by reducing the corresponding Δ²-cyclopentenone acid or by reducing the methyl ester of this latter acid and then hydrolysing, the reduction in either case being carried out with hydrogen in the presence of methyl alcohol and palladised strontium carbonate.

3',4-Diketo-1,2,3,4-tetrahydro-1,2-cyclopentenophenanthrene is obtained as follows:

A solution of 6 g. of the above cyclopentanone acid in 20 cc. of syrupy phosphoric acid of density 1.75 is made by gentle heating, and 50 g. of phosphoric anhydride is gradually but quickly added with vigorous shaking. The temperature rises above 100° and a faint odour of naphthalene becomes perceptible. After 1 hour, ice is added to the dark green mixture and the product is isolated by extraction with ether and also with ethyl acetate. The solutions are washed with aqueous sodium carbonate and then with water, dried, and evaporated. The residue crystallises from a little alcohol to give colourless needles (M. Pt. 115° C.) of the cyclopentenophenanthrene.

Example 6

3',4-Diketo-7-methoxy-1,2,3,4-tetrahydro-1,2-cyclopentenophenanthrene is obtained in a similar manner to that described in Example 5 from 5 g. of 3-(6-methoxy-β-naphthyl)-cyclopentan-1-one-2-acetic acid (prepared from the Δ²-cyclopentenone acid and preferably from the methyl ester of this acid) 15 cc. of syrupy phosphoric acid of density 1.75 and 50 g. phosphoric anhydride. The product crystallises from alcohol (charcoal) in well shaped prisms of M. Pt. 126–127° C.

It has been stated above that the heptoic acid referred to in Example 1 may be obtained by the method described in Kehrer and Igler (loc. cit.). Corresponding methods may be employed in the preparation of the heptoic acids referred to in Examples 2, 3 and 4. Thus ζ-β-naphthyl-γζ-diketoheptoic acid may be prepared by adding 100 g. of 2-acetylnaphthalene and 65 cc. of furfuraldehyde dissolved in 100 cc. of ethyl alcohol to a cold solution of 5 g. of sodium in 200 cc. of alcohol. After a few hours, the condensation product, namely furfurylidene-2-acetylnaphthalene, has separated in good yield and is sufficiently pure to be used for conversion into the required acid. For this purpose 20 g. of the material are mixed with 200 cc. of alcohol and 50 cc. of hydrochloric acid (of density 1.16) and the whole is boiled under a reflux condenser during 18 hours. The alcohol is removed by distillation (finally under diminished pressure) and the residue is repeatedly extracted under a reflux condenser, by means of a boiling mixture of hydrochloric acid (100 cc. of acid of density 1.16) with glacial acetic acid (100 cc.) and water (200 cc.), the hot aqueous acid solution after each extraction being decanted from the oil, filtered and allowed to cool and the crystals separated. The aqueous acid solution is used for another extraction, and the process is repeated until no further crystalline material is obtained when the hot solution is cooled. The successive crops of crystals are mixed and may be used directly in the process described in Example 2, or if required, the product may be recrystallised from acetic acid, when the above naphthyl diketoheptoic acid is obtained as needles which melt at 167–169° C.

To prepare ζ - (6 - methoxy - β - naphthyl) -γζ- diketoheptoic acid in a similar manner, 6-acetyl-2-methoxynaphthalene (obtained for example, by the method of Haworth and Sheldrick, J. Chem. Soc. 1934, 865), is converted into its furfurylidene derivative in the manner indicated above, and this compound is converted into the required acid by boiling it (14 g.) under a reflux condenser with alcohol (240 cc.) and hydrochloric acid (60 cc. of acid of density 1.16) during 15 hours. After removal of the alcohol by distillation the product is extracted with a boiling mixture of hydrochloric acid (80 cc. of acid of density 1.16), glacial acetic acid (100 cc.) and water (200 cc.), the extraction being repeated as in the case of the naphthyl derivative until no further appreciable amount of product is obtained. The methoxynaphthyldiketoheptoic acid melts at 142–143° C. when it is recrystallised from aqueous acetic acid.

It should be added that where the furfurylidene derivative of 6-acetyl-2-methoxynaphthalene is converted to the diketonic acid by boiling it with hydrochloric acid there is a certain amount of demethylation, so that the compound ζ-(6-hydroxy-β-naphthyl)-γζ-diketoheptoic acid is produced to some extent, and this on treatment with the aqueous potassium hydroxide is converted to 3-(6-hydroxy-β-naphthyl)-Δ²-cyclopenten-1-one-2-acetic acid. This latter substance on treatment according to Example 3 yields 4,7-dihydroxy-3'-keto-1,2-cyclopentenophenanthrene. Thus in Example 3 the mixture of methoxy or hydroxy cyclopentenone acetic acids may be treated, or the crude cyclopentenone acetic acid may be remethylated (e. g. by treatment with methyl sulphate and sodium hydroxide in aqueous or alcoholic solution) to remove hydroxy groups in the naphthyl group prior to the final condensation, or the initial crude diketoheptoic acid may be remethylated. Alternatively, the crude diketoheptoic acid or the pentenone compound may be fully demethylated by heating it with a mixture of acetic and hydrobromic acids and a hydroxy-substituted cyclopentenophenanthrene finally obtained, which if desired may then itself be methylated.

By employing methods substantially similar to those above described, 1-chloro-2-methoxynaphthalene may be successively converted into 5-chloro - 6 - methoxy-2-acetylnaphthalene, the furfurylidene derivative of this ketone and finally into the chloro-methoxynaphthyl-diketoheptoic acid which is referred to in Example 4. Thus 1-chloro-2-methoxy-6-acetyl-naphthalene (white crystals of melting point 124° C.) can be obtained by the action of acetyl chloride on 1-chloro-2-methoxy-naphthalene in nitrobenzene solution in the presence of aluminium chloride. Its furfurylidene derivative can be obtained and this converted to the diketo-acid as described above but using two to three times as much acetic acid. The diketo-acid forms colourless needles of melting point 193–194° C.

In the claims the terms "phenyl radicals having a hydrogen atom at an ortho position," "β- polynuclear aromatic radicals having a hydrogen atom at the α position" and "β-naphthyl radicals having a hydrogen atom at the α position" are intended to mean both substituted and unsubstituted phenyl, β-polynuclear aromatic, and β-naphthalene radicals which are attached to the radical

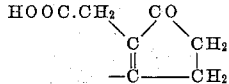

or the radical

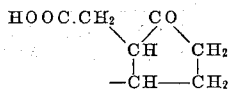

by a valence bond of a nuclear carbon atom. Furthermore, in the claims the terms "phenyl residues" and "polynuclear aromatic residues" are intended to mean both substituted and unsubstituted phenyl and polynuclear aromatic residues.

I claim:

1. A process for the production of cyclic compounds which comprises heating a compound selected from the group consisting of

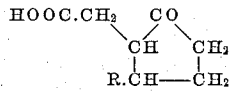

and

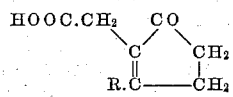

wherein R is an aromatic radical selected from the group consisting of phenyl radicals having a hydrogen atom at an ortho position, and β-polynuclear aromatic radicals having a hydrogen atom at the α position in the presence of an acid condensing agent to eliminate water between the carboxyl group and the position of the aromatic radical having the hydrogen atom whereby a closed ring is formed.

2. A process for the production of cyclic compounds which comprises heating a compound of the formula

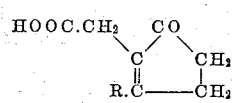

wherein R is an aromatic radical selected from the group consisting of phenyl radicals having a hydrogen atom at an ortho position and β-polynuclear aromatic radicals having a hydrogen atom the the α position, in the presence of an acid condensing agent to eliminate water between the carboxyl group and the position of the aromatic radical having the hydrogen atom whereby a closed ring is formed.

3. A process for the production of cyclic compounds which comprises heating a compound selected from the group consisting of

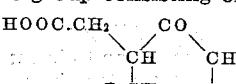

and

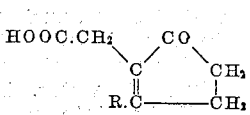

wherein R is an aromatic radical selected from the group consisting of phenyl radicals having a hydrogen atom at an ortho position and β-polynuclear aromatic radicals having a hydrogen atom at the α position, in the presence of an acid condensing agent selected from the group consisting of acid anhydrides and strong mineral acids to eliminate water between the carboxyl group and the position of the aromatic radical having the hydrogen atom whereby a closed ring is formed.

4. A process for the production of cyclic compounds which comprises heating a compound of the formula

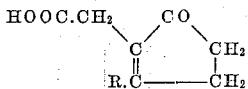

wherein R is an aromatic radical selected from the group consisting of phenyl radicals having a hydrogen atom at an ortho position and β-polynuclear aromatic radicals having a hydrogen atom at the α position, in the presence of an acid condensing agent selected from the group consisting of acid anhydrides and strong mineral acids to eliminate water between the carboxyl group and the position of the aromatic radical having the hydrogen atom whereby a closed ring is formed.

5. A process for the production of cyclic compounds which comprises heating a compound of the formula

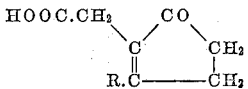

wherein R is a β-naphthyl radical having a hydrogen atom at the α position in the presence of an acid condensing agent to eliminate water between the carboxyl group and the position of the naphthyl radical having the hydrogen atom whereby a closed ring is formed.

6. A process for the production of cyclic compounds which comprises heating a compound of the formula

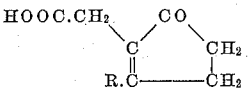

wherein R is an aromatic radical selected from the group consisting of phenyl radicals having a hydrogen atom at an ortho position and β-polynuclear aromatic radicals having a hydrogen atom at the α position, in the presence of an acid anhydride to eliminate water between the carboxyl group and the position of the aromatic radical having the hydrogen atom whereby a closed ring is formed.

7. A process for the production of cyclic compounds which comprises heating a compound of the formula

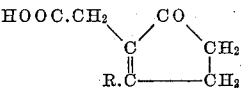

wherein R is an aromatic radical selected from the group consisting of phenyl radicals having a hydrogen atom at an ortho position and β-polynuclear aromatic radicals having a hydrogen atom at the α position, in the presence of an aliphatic anhydride to eliminate water between the carboxyl group and the position of the aromatic radical having the hydrogen atom whereby a closed ring is formed.

8. A process for the production of cyclic compounds which comprises heating a compound of the formula

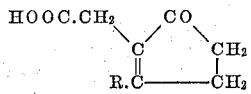

wherein R is an aromatic radical selected from the group consisting of phenyl radicals having a hydrogen atom at an ortho position and β-polynuclear aromatic radicals having a hydrogen atom at the α position, in the presence of an acetic anhydride to eliminate water between the carboxyl group and the position of the aromatic radical having the hydrogen atom whereby a closed ring is formed.

9. A process for the production of cyclic compounds which comprises heating a compound of the formula

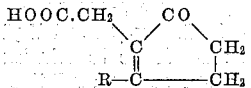

wherein R is a β-naphthyl radical having a hydrogen atom at the α position and contains at least one substituent alkoxy group, in the presence of an acid condensing agent selected from the group consisting of acid anhydrides and strong mineral acids to eliminate water between the carboxyl group and the position of the naphthyl radical having the hydrogen atom whereby a closed ring is formed.

10. A process for the production of cyclic compounds which comprises heating a compound of the formula

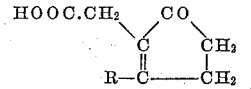

wherein R is a β-naphthyl radical having a hydrogen atom at the α position and contains at least one substituent hydroxy group in the presence of an acid condensing agent selected from the group consisting of acid anhydrides and strong mineral acids to eliminate water between the carboxyl group and the position of the naphthyl radical having the hydrogen atom whereby a closed ring is formed.

11. A process for the production of cyclic compounds which comprises heating a compound of the formula

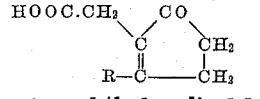

wherein R is a β-naphthyl radical having a hydrogen atom at the α position and contains at least one substituent halogen atom in the presence of an acid condensing agent selected from the group consisting of acid anhydrides and strong mineral acids to eliminate water between the carboxyl group and the position of the naphthyl radical having the hydrogen atom whereby a closed ring is formed.

12. A process for the production of cyclic compounds which comprises heating a compound of the formula

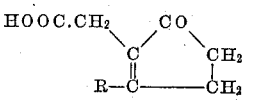

wherein R is 6-methoxy-β-naphthyl, in the presence of acetic anhydride to eliminate water between the carboxyl group and the α position of the naphthyl radical whereby a closed ring is formed.

13. A process for the production of cyclic compounds which comprises heating a compound of the formula

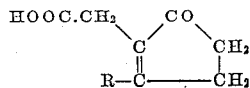

wherein R is 5-chloro-6-methoxy-β-naphthyl, in the presence of acetic anhydride to eliminate water between the carboxyl group and the α position of the naphthyl radical whereby a closed ring is formed.

14. A process for the production of cyclic compounds which comprises heating a compound of the formula

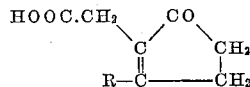

wherein R is 6-hydroxy-β-naphthyl, in the presence of acetic anhydride to eliminate water between the carboxyl group and the α position of the naphthyl radical whereby a closed ring is formed.

15. A cyclic compound of the formula

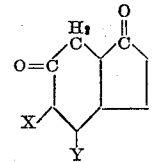

wherein X and Y together form part of an aromatic nucleus.

16. A cyclic compound of the formula

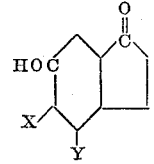

wherein X and Y together form part of an aromatic nucleus.

ROBERT ROBINSON.